United States Patent
Iwamura et al.

(10) Patent No.: US 6,715,051 B2
(45) Date of Patent: Mar. 30, 2004

(54) PROGRAM MODIFICATION DEVICE

(75) Inventors: Yoshiyuki Iwamura, Hirakata (JP); Fumio Sumi, Katano (JP); Noriyuki Manabe, Takatsuki (JP); Hiroshi Sakamoto, Toyonaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 295 days.

(21) Appl. No.: 09/742,240

(22) Filed: Dec. 22, 2000

(65) Prior Publication Data

US 2001/0007124 A1 Jul. 5, 2001

(30) Foreign Application Priority Data

Dec. 24, 1999 (JP) ............................. 11-366384

(51) Int. Cl.[7] ............................................. G06F 12/00
(52) U.S. Cl. ...................... 711/165; 711/221; 717/168; 714/6
(58) Field of Search .................. 711/102, 103, 711/165, 221; 717/168, 169, 120; 714/5, 6, 8

(56) References Cited

U.S. PATENT DOCUMENTS

| | | | | |
|---|---|---|---|---|
| 4,542,453 A | * | 9/1985 | Patrick et al. ................ | 714/8 |
| 5,274,815 A | * | 12/1993 | Trissel et al. ................ | 712/226 |
| 5,592,613 A | | 1/1997 | Miyazawa et al. ...... | 395/182.04 |
| 5,784,537 A | | 7/1998 | Suzuki et al. .......... | 395/182.03 |
| 5,983,000 A | | 11/1999 | Perron ................... | 395/182.06 |

FOREIGN PATENT DOCUMENTS

| | | |
|---|---|---|
| EP | 0 553 733 | 1/1993 |
| JP | 07-073032 | 3/1995 |

* cited by examiner

*Primary Examiner*—Glenn Gossage
*Assistant Examiner*—Brian R. Peugh
(74) *Attorney, Agent, or Firm*—Parkhurst & Wendel, L.L.P.

(57) ABSTRACT

In modifying a program fixedly recorded in a ROM or the like, desired positions in the program can be modified with a little hardware. In order to achieve the object, the program modification device comprises the modifying address register 17 which stores the addresses of program data to be modified prior to the execution of the data and the modifying address storage table 19 which stores all the addresses of the modification source programs to be loaded to the modifying address register 17 and all the addresses of the modification target programs in pairs, and further comprises a modification target program having instructions embedded therein so as to load necessary information from the modifying address storage table 19 to the modifying address register 17 before the program to be modified is executed.

8 Claims, 15 Drawing Sheets

Modifying Address Register

Fig. 15
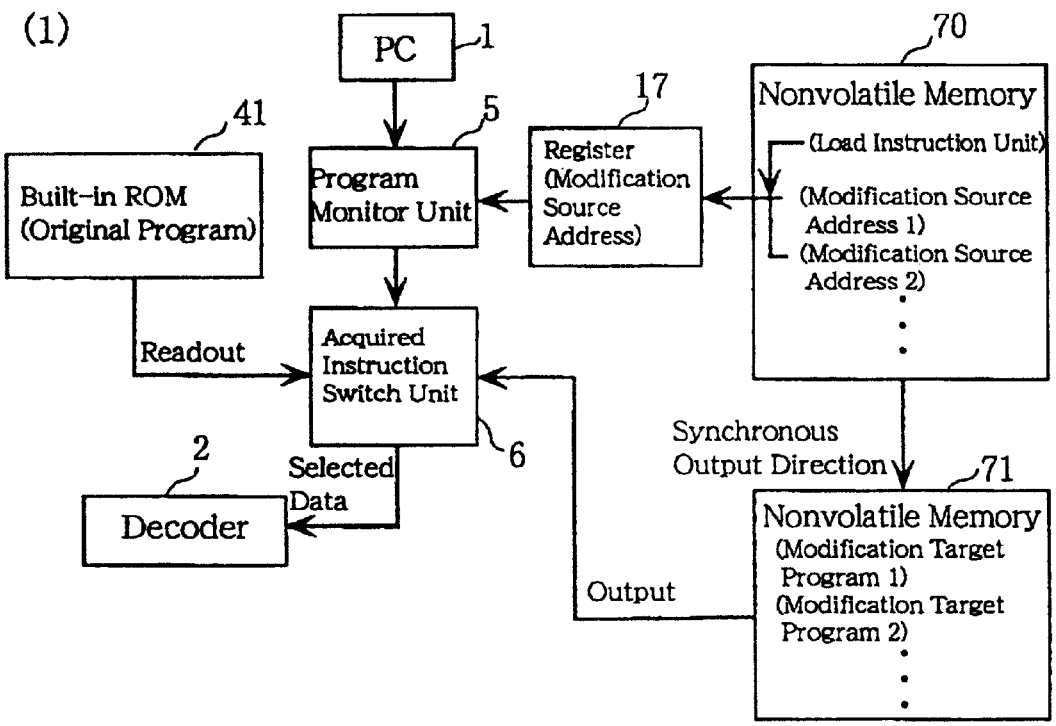
(1)
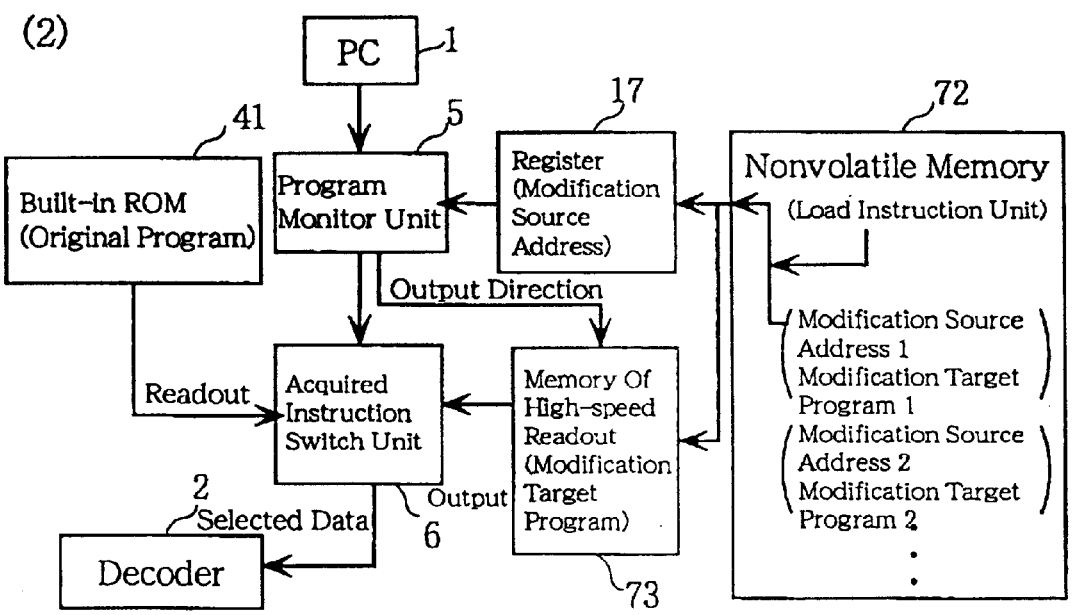
(2)

PROGRAM MODIFICATION DEVICE

TECHNICAL FIELD

The present invention relates to program modification, and more specifically, to program modification used in a computer system which executes programs fixed on instruction ROM and the like.

BACKGROUND ART (General Background)

Conventional program modification devices include devices with a register for modification and devices containing indirect jump instructions in programs.

One such program modification device will be described as follows with reference to the drawings. (This device should be more strictly referred to as a program device provided with a function of modifying and executing programs fixed on ROM or the like; however, it is simply referred to as the program modification device).

FIG. 1 shows the entire structure of this conventional program modification device, and FIG. 2 shows the details of its main part.

In FIG. 1 the program modification device comprises a CPU core unit 1 including an execution unit 2 and an instruction acquisition unit 3, an instruction ROM 4 which stores programs, a program monitor unit 5 which checks whether the program portion which is going to be executed is a program portion (program data) to be modified or not, and an acquired instruction switch unit 6 which switches between acquiring the instruction the instruction acquisition unit 3 is going to execute from the instruction ROM 4 or acquiring it from a modification target program storage memory A, which will be described later, based on the determination of the program monitor unit 4.

The program modification device further comprises modifying address registers 7 which store the addresses of program data that need to be modified (hereinafter referred to as the modification source program data) and the addresses of program data that are modified and executed instead of the modification source program data (hereinafter referred to as the modification target program data) in pairs; a modification target program storage memory A 8 which stores modification target program data; an indirect call instruction row 9 contained in the instruction ROM 4; an indirect call table 10 which is referred to by the indirect call instruction row 9; and a modification target program storage memory B 11 which stores branch target program data branching in the indirect call table 10 (when there is no modification in a program, the branch target in the indirect call table 10 is in the ROM 4).

It goes without saying that this program modification device may further comprise a CRT or a liquid crystal display device, a keyboard, clock signal generation means, CD-ROM readout means, and a code correction unit, depending on the use of the computer system equipped with the program modification device.

In terms of the object of the present invention, the modification target program storage memory A 8 and the modifying address registers 7 are dispensable unless the programs in the instruction ROM 4 or the CD-ROM but also a so-called address group consisting of consecutive addresses, a specific region on memory, and a specific one memory among plural memories.

The following is a continuation of the description of the conventional program modification device.

FIG. 2 (1) is a conceptual illustration showing the inside of the instruction ROM 4. FIG. 2 (2) is a conceptual illustration showing the inside of the modifying address registers 7. FIG. 2 (3) is a conceptual illustration showing the inside of the modification target program storage memory A 8. FIG. 2 (4) is a conceptual illustration showing the inside of the indirect call table 10. FIG. 2 (5) is a conceptual illustration of the modification target program storage memory B 11.

The behavior of the program modification device will be described as follows.

Assume that addresses A1 and A2 in the instruction ROM 4 shown in FIG. 2 (1) are the addresses of the modification source program data with errors, and the program data at addresses B1 and B2 shown in FIG. 2 (2) are executed instead of the program data at these addresses A1 and A2, respectively.

Also assume that the indirect call instruction row in the instruction ROM 4 shown in FIG. 2 (1), which branches to the address a1 in the instruction ROM 4, is so modified as to branch to the address b1 in the modification target program memory B 11 as shown in FIG. 2 (4).

1) In order to execute the program data of the addresses B1 and B2 instead of the program data of the addresses A1 and A2, the addresses A1 and B1 as a pair and the addresses A2 and B2 as another pair are written into the modifying address registers 7 as shown in FIG. 2 (2). Furthermore, the indirect call table 10 shown in FIG. 2 (4) is changed from the address a1 which is before the modification to the address b1 which is after the modification.

2) The instruction acquisition unit 3 sequentially acquires instructions from the instruction ROM 4, and the execution unit 2 executes the instructions.

3) The program monitor unit 5 continuously checks whether or not the address of program data acquired by the instruction acquisition unit 3 agrees with the address of the modification source program data in the modifying address registers 7 by referring to the modifying address registers 7.

4) When the instruction acquisition unit 3 tries to acquire program data from the address A1 in the instruction ROM 4, the program monitor unit 5 detects agreement between the address 1 and the address of the modification source program data which is written in the modifying address registers 7. Then, the program monitor unit 5 makes the acquired instruction switch unit 6 acquire not the program data at the address A1 but the program data at the address B1, which is stored with the address A1 in a pair.

5) The acquired instruction switch unit 6 switches the instruction acquisition unit 3 so that the unit 3 acquires instructions not from the address A1 in the instruction ROM 4 but from the address B1 on the modification target program storage memory A 8. As a result, the program data at the address A1 in the instruction ROM 4 are modified into the program data at the address B1 on the modification target program storage memory A 8. In the same procedure, the program data at the address A2 is modified into the program data at the address B2.

6) The instruction acquisition unit 3 acquires instructions from the indirect call instruction row on the instruction ROM 4, and the execution unit 2 executes the instructions. If it is before the modification of the program (before the change of the indirect call table 10), the indirect call table 10 is referred to so as to acquire instructions from the address a1.

In reality, the indirect call table 10 is changed from the address a1 to the address b1, so that after the execution of the indirect call instruction, instructions are acquired from the address b1. This indicates that the program data at the address a1 in the instruction ROM 4 have been modified into the program data on the modification target program storage memory B 11.

In the above-mentioned procedure, inherently non-modifiable errors in the programs fixed on the instruction ROM or the like or found after the fabrication of ROM can be modified.

Of the modification target program storage memories A 8 and B 11 shown in FIG. 1, either one could be used, or they could be physically one.

As another conventional device, FIG. 3 shows another system which is basically the same the above-mentioned conventional device. In FIG. 3 a built-in ROM 41 corresponds to the instruction ROM 4 shown in FIG. 1, and a PC 1 and a decoder 2 correspond to the CPU core unit 1 shown in FIG. 1. The acquired instruction switch unit 6 is a kind of selector. When the program monitor unit 5 receives the address of a modification source program, the acquired instruction switch unit 6 receives the corresponding modification target program data from a modification target program memory 81 at the same time, and forwards the program data to the decoder 2.

These techniques will not be described any further because these are disclosed in Japanese Laid-Open Patent Applications No.7-73032, No.3-186927, No. 3-33926, U.S. Pat. No. 5,592,613, and the like.

(Background Art in Terms of the Problems the Invention is Going to Solve)

In the aforementioned structure, however, in order to modify a program at plural positions, a pair of modifying address registers are needed for each position. Therefore, as shown in FIG. 2 (2), a large number of registers are required as modifying address registers, which leads to an increases in hardware scale. (In storing the same amount of information, an increase in hardware scale is tremendous because registers demand about 50 times as large as circuit size as memories).

When program modification is performed by an indirect call, it is possible only from the position where the indirect call instruction row is arranged. Therefore, even when there are only a few steps in a program which are desired to be modified, it is necessary to store (or write), as a modified program, the steps from the indirect call instruction row portion to the modified portion which do not actually need to be modified. This unnecessarily increases the modification target program in size in the modification target program storage memories A 8 and B 11.

When the program modification device is incorporated into a system, programs are usually put in the form of ROM chips. When bugs are found in a ROMed program, the ROM must be modified; however, it takes about 5 weeks to complete modified ROM chips. This may cause to miss the timing of the introduction of a set device with the ROM chips on the market. Avoiding this program requires a ROM program modification function. However, the addition of the function leads to an increase in the number of registers (modifying address registers) which are highly unlikely used, thereby boosting the cost, or leads to the consumption of the memory to accommodate a large program to be modified (generally, flush memory in a microcomputer such as a system controller), which also boosts the cost.

In view of these problems, it has been desired to develop a program modification device which can use only a small number of modifying address registers and a minimum number of steps when a program contains lots of positions to be modified.

Besides the error correction of program data, it is often conducted to upgrade programs. In that case, it would become burdensome to users to purchase the whole device system where the whole new program is recorded. There are quite a few user requests for the upgraded or error-corrected portions only at a low price. Therefore, it would be advantageous for the manufactures in a field where upgrading occurs at high speed to design their devices to be capable of adding upgraded functions.

In order to address these needs, it has been desired to achieve a program modification device capable of addressing not only error correction but also upgrading easily and at a low cost, or a device which can have such a program modification device therein.

DISCLOSURE OF THE INVENTION

The present invention, which has been contrived in view of the above-mentioned problems, rewrites the contents of registers sequentially by the instructions and data contained in the modification target programs in memory (or in the programs in ROM before being modified). The details of the present invention are as follows.

In the invention of aspect 1, for each of the modification source program data not executed due to age or the presence of errors, modified modification target program data to be executed in place of the modification source program data are stored at predetermined addresses in memory for modification target program data which is usually composed of an inexpensive storage element or a storage medium. Moreover, the addresses of the modification source program data and the addresses of the corresponding modification target program data are recorded in pairs basically for each kind of error correction in a modifying address storage table made of an inexpensive storage element or the like.

Under these circumstances, the modifying address register writes programs for execution to the ROM so as to store the addresses of the program data for modification which are used to correct program errors found after the completion of ROM and the addresses of the modification source program data in pairs before the address unit executes the program data.

When modification instructions concerning (or received due to) the addresses for program modification stored in the modifying address register or load modification instructions are detected in a program in the process of being executed, the execution unit contained in the CPU core unit reads the addresses of the modification source program data and the addresses of the modification target program data from the modifying address storage table in accordance with the contents of the load modification instructions, and then loads (or stores) the addresses to the modifying address resister.

The program monitor unit refers to the modifying address resister either directly or indirectly and checks whether or not the address to be executed next (or a little bit earlier) in the program agrees with the address of the modification source program in the modifying address registers prior to the execution of the data at the address.

When the program monitor unit detects agreement between the addresses, the acquired instruction switch unit makes the address of the modification target program in the modifying address register the address of the program to be executed next by the CPU core unit. Thus, the error-containing modification source program data are replaced by modified program data.

Consequently, errors at any positions in a program can be corrected by the switch of an execution program having a minimum number of steps to be actually modified with the use of less hardware, which is a usually expensive modifying address register.

Unlike the invention of aspect 1, in the invention of aspect 2, the modifying address resister stores only the modification source addresses in order to minimize the register in size and other reasons. Detecting a load modifying instruction in a program, the execution unit contained in the CPU core unit stores only the addresses of the modification source program data to the modifying address register in accordance with the load modification instruction.

As a result, the acquired instruction switch unit finds the modification target address corresponding to the modification source address from the modification source address storage table, thereby making the modified program data corresponding to the address be executed.

Similar to the invention of aspect 2, in the invention of aspect 3, only modification source addresses are stored in the register. Moreover, there is some information to specify the modification target address on memory instead of this address. To be more specific, before or after the load modification instruction, the identifier of the load modification instruction is written on a specific memory so as to specify the modification target address from the identifier. In the invention of this aspect, the system needs only one such memory, which can downsize the memory.

Furthermore, the modification target program data are stored in memory in the order in which the programs are executed in such a manner that before and after the program data could be known. In that case, in the modifying address register, the addresses of the modification source program data are stored (or overwritten) in the order in which the programs are executed.

The invention of aspect 4 is characterized by comprising a modification target program storage memory which stores modification target programs, and in that the load modification instructions of the modifying address register are contained at the predetermined positions in a program in the modification target program storage memory. As a result, in accordance with the execution of a program in the CPU execution unit, the information on the address of the program data to be modified in the modifying address register is subjected to a modification process such as rewriting, prior to the execution of the program in the address unit. This can reduce the number of load modification instructions which are the load instructions to the modifying address register previously embedded in the instruction ROM.

The invention of aspect 5 is characterized in that a plurality of modifying address registers are correspondingly provided to the respective modification types, and that a plurality of load modification instructions to be loaded to the respective modifying address registers are contained in a program. As a result, in each modifying address register, program modification can be done independently in accordance with the type of modification determined by the contents of modification such as the modification of the program itself or the modification of data necessary for program execution.

The invention of aspect 6 is characterized in that the load modification instructions to be loaded from the modifying address storage table to the modifying address registers are included in the heads of task switch points and of interrupt-service routines.

Consequently, modification instructions are arranged at all the heads of the positions which operate asynchronously. Arranging and combining modification instructions in the modification target program storage memory in this manner makes it possible to embed the modification instructions only at the heads of the task switch points and of interrupt-service routines in the instruction ROM, thereby minimizing the number of modification instructions. When additional modification instructions are required, they can be arranged on the modification target program storage memory so as to realize program modification at a necessary number of positions.

The invention of aspect 7 is characterized in that the load modification instructions to be loaded from the modifying address storage table to the modifying address registers are contained at least in one of the heads of the task switch points, disk sync detection interrupt-service routines, error correction interrupt-service routines, host transfer interrupt-service routines, and servo-controlled routines. In the case of an optical disk controller, program modification can be realized by arranging a minimum number of modification instructions.

It goes without saying that in the invention of each aspect, the identifiers of the load modification instructions stored in the modification source registers, the modification target registers and the memories are saved before the occurrence of an interrupt service and then returned to their original states after the completion of the interrupt service.

BRIEF DESCRIPTION OF THE DRAWINGS

FIGS. 15 (1) and 15 (2) show the characteristics of the fourth embodiment of the program modification device of the present invention.

EXPLANATION OF REFERENCE NUMBERS

Figure 1:
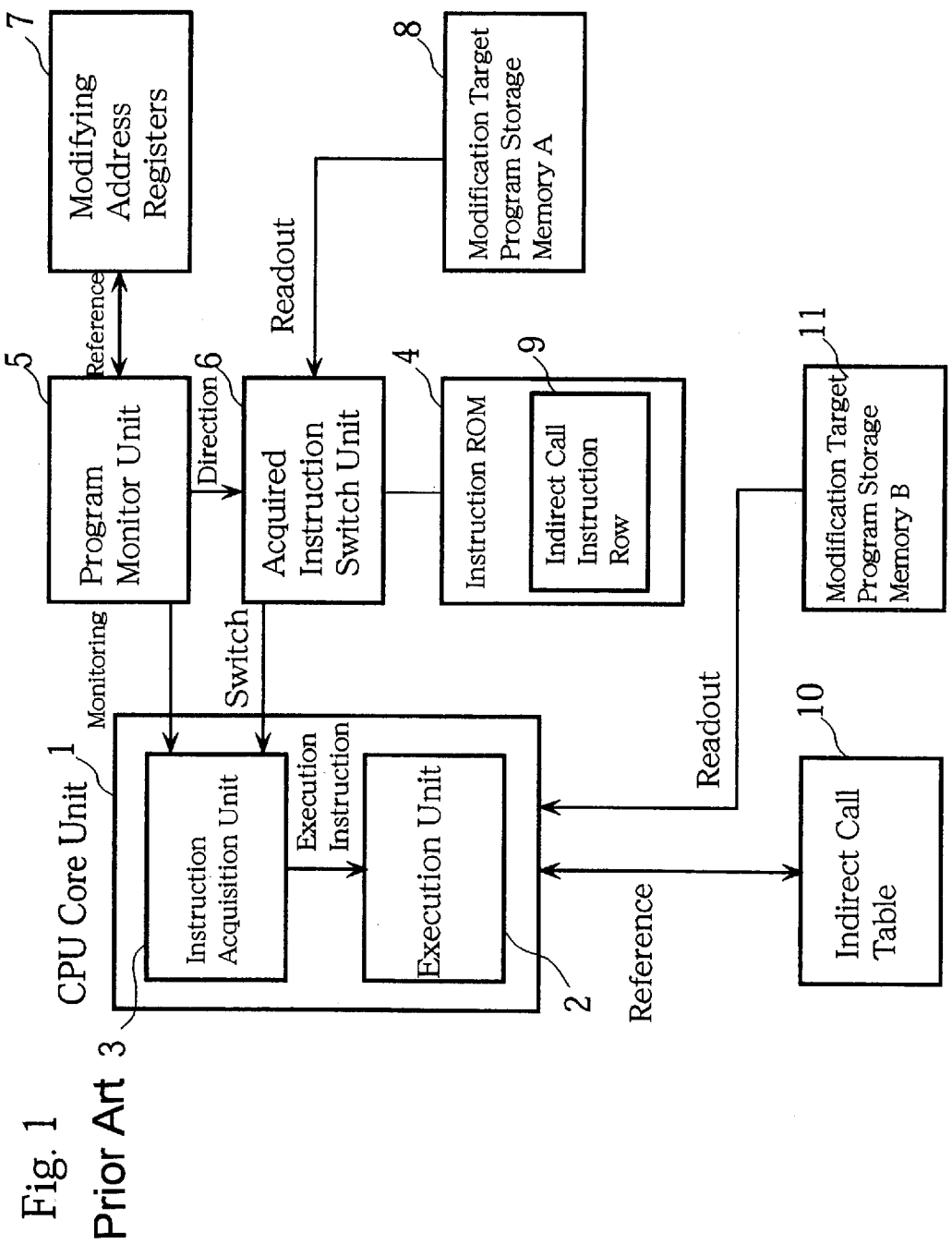
FIG. 1 shows the structure of a conventional program modification device.

1 CPU core unit
2 execution unit, decoder 3 instruction acquisition unit
4 instruction ROM
41 built-in ROM
14 instruction ROM (embodiment)
5 program monitor unit
6 acquired instruction switch unit
7 modifying address registers
17 modifying address register (embodiment)
8 modification target program storage memory A
81 modification target program storage memory
18 modification target program storage memory
9 indirect call instruction row
19 modifying address storage table (embodiment)
10 indirect call table
11 modification target-program storage memory B
31 modification instruction 3
41, 42, 44, 45 modification instructions to be loaded to the modification source program address register for use 1
43 modification instructions to be loaded to the modification target program address register for use 2
61 disk sync detection interrupt-service routine
62 error correction interrupt-service routine
63 host transfer interrupt-service routine
64 main process routine
70 nonvolatile memory (for modification source address)
71 nonvolatile memory (for modification target program)
72 nonvolatile memory (for modification source address and modification target program)
73 memory capable of high-speed readout
90 personal computer
91 optical disk drive (DVD)
92 optical disk controller (ODC)
93 system controller
94 memory
95 optical disk
96 hard disk (HD)
100 execution program
101 address section of execution programs
102 data section of execution programs
110 memory for modification programs
111 modification source program data unit
112 next modification preparation data unit
113 return data unit
211 modification source program address register for use 1
212 modification target program address register for use 1
221 modification source program address register for use 2
222 modification target program address register for use 2

PREFERRED EMBODIMENT OF THE INVENTION

The present invention will be described as follows based on the embodiments.
(Embodiment 1)

In the present embodiment, the addresses of modification source program data and the addresses of modification target program data are stored in pairs in modifying address register so as to achieve rapid response.

The program modification device of the present embodiment will be described as follows, with reference to the drawings.

Figure 4:
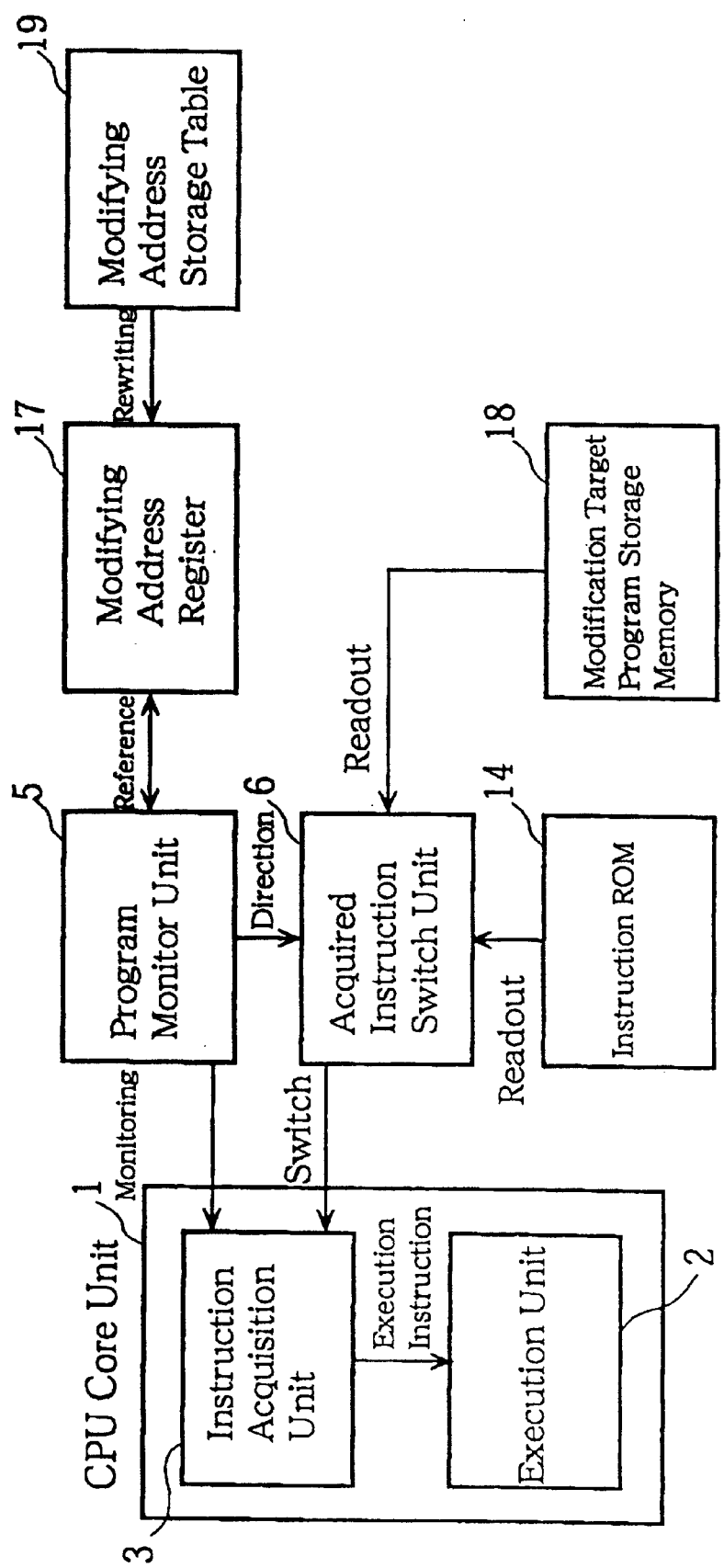
FIG. 4 shows the structure of the first embodiment of the program modification device of the present invention.

FIG. 4 shows the structure of the program modification device of the present embodiment. As shown in FIG. 4 the device comprises a CPU core unit 1 including an execution unit 2 and an instruction acquisition unit 3, a program monitor unit 5 and an acquired instruction switch unit 6. These components basically have the same actions and functions as those in the above-described conventional devices, so that their detailed description will be omitted.

The program modification device of the present embodiment further comprises an instruction ROM 14, a modification target program storage memory 18, a modifying address register 17 and a modifying address storage table 19 which stores the modification target addresses to be loaded to a modification source program address register in the modifying address register 17 and the modification target addresses to be loaded to a modification target program address register in the modifying address register 17.

Figure 5:
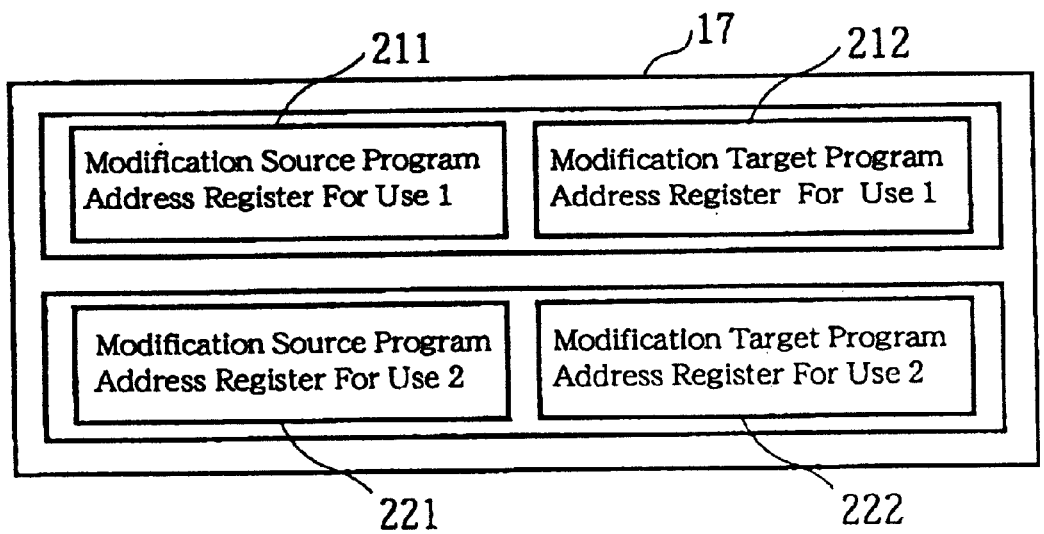
FIG. 5 shows the conceptual illustration of the modifying address register of the program modification device.
Figure 6:
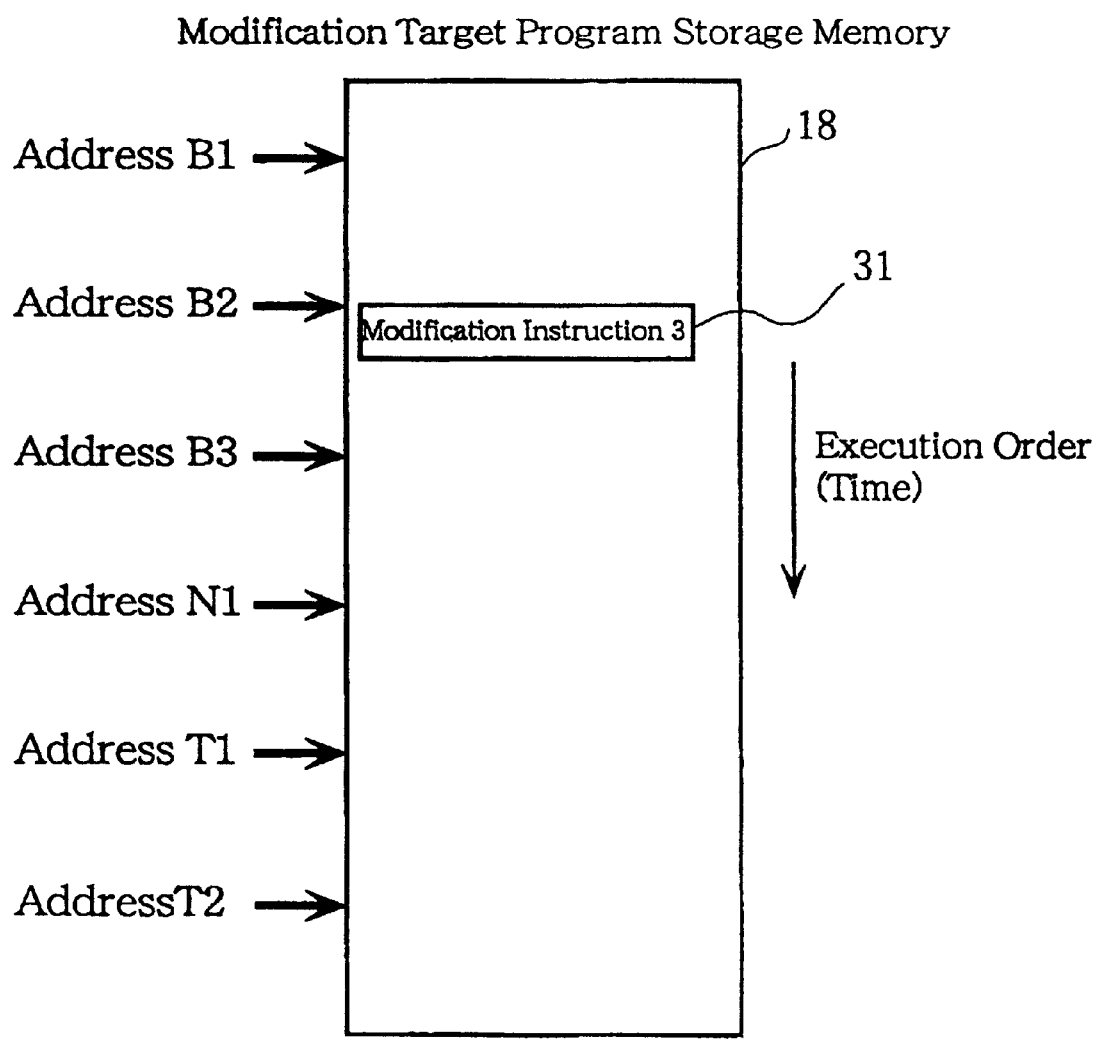
FIG. 6 shows the conceptual illustration of the modification target program storage memory.
Figure 7:
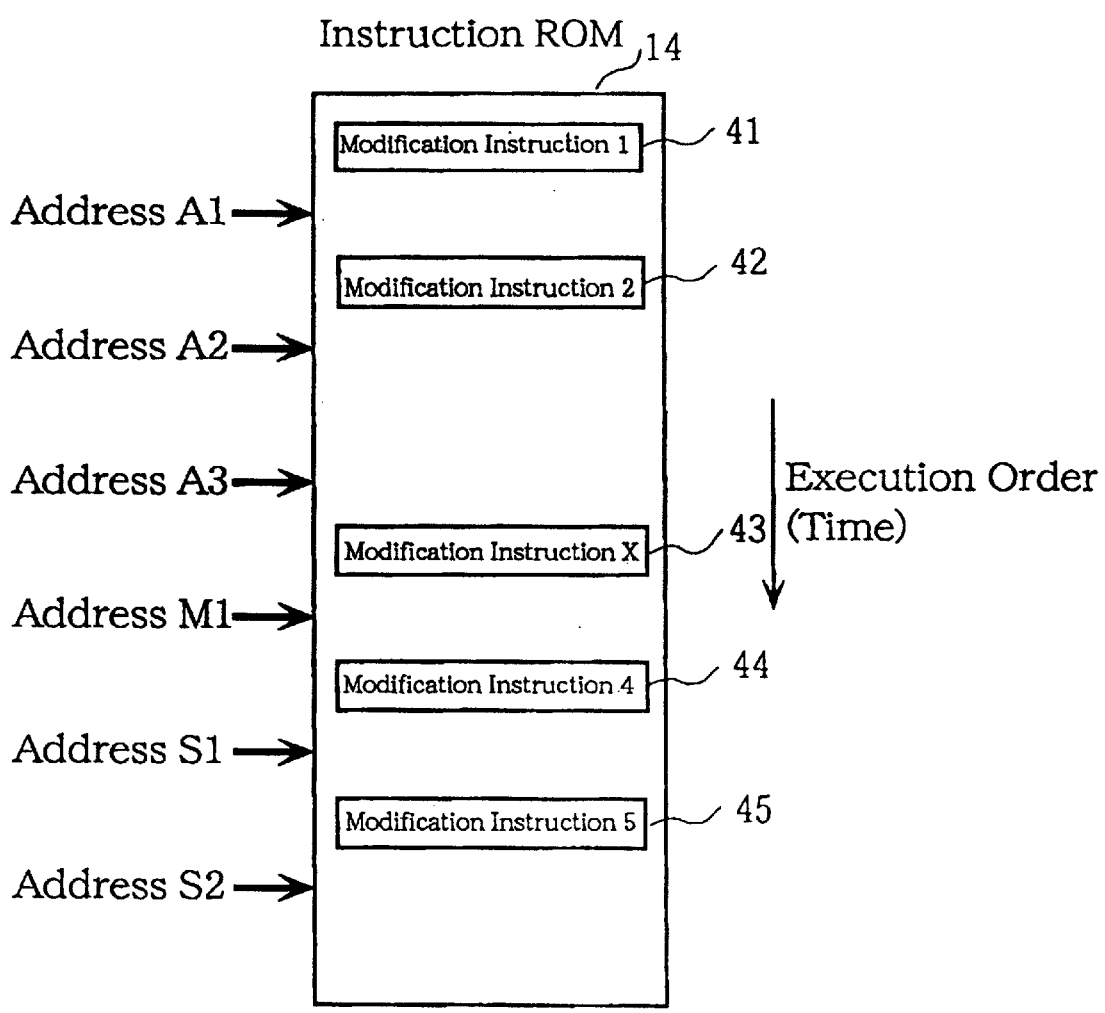
FIG. 7 shows the conceptual illustration of the instruction ROM.
Figure 8:
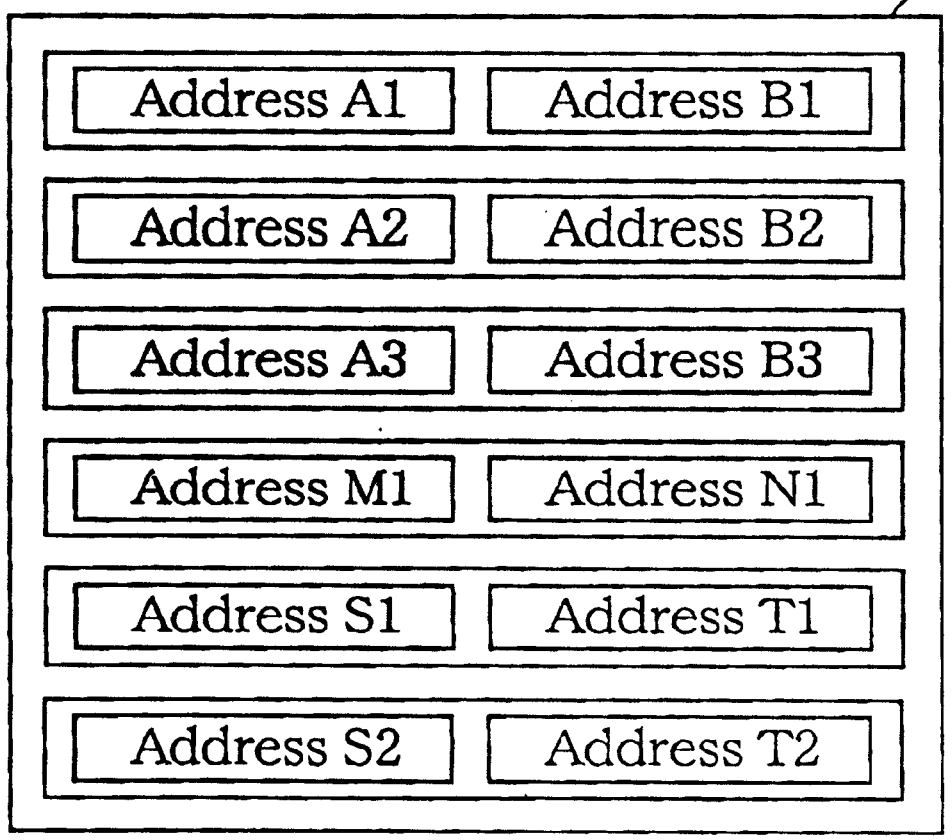
FIG. 8 shows the conceptual illustration of the modifying address storage table.

FIG. 5 shows the conceptual illustration of the inside of the modifying address register 17. FIG. 6 shows the conceptual illustration of the inside of the modification target program storage memory 18. FIG. 7 shows the conceptual illustration of the instruction ROM 14. FIG. 8 shows the conceptual illustration of the inside of the modifying address storage table 19.

Figure 2:
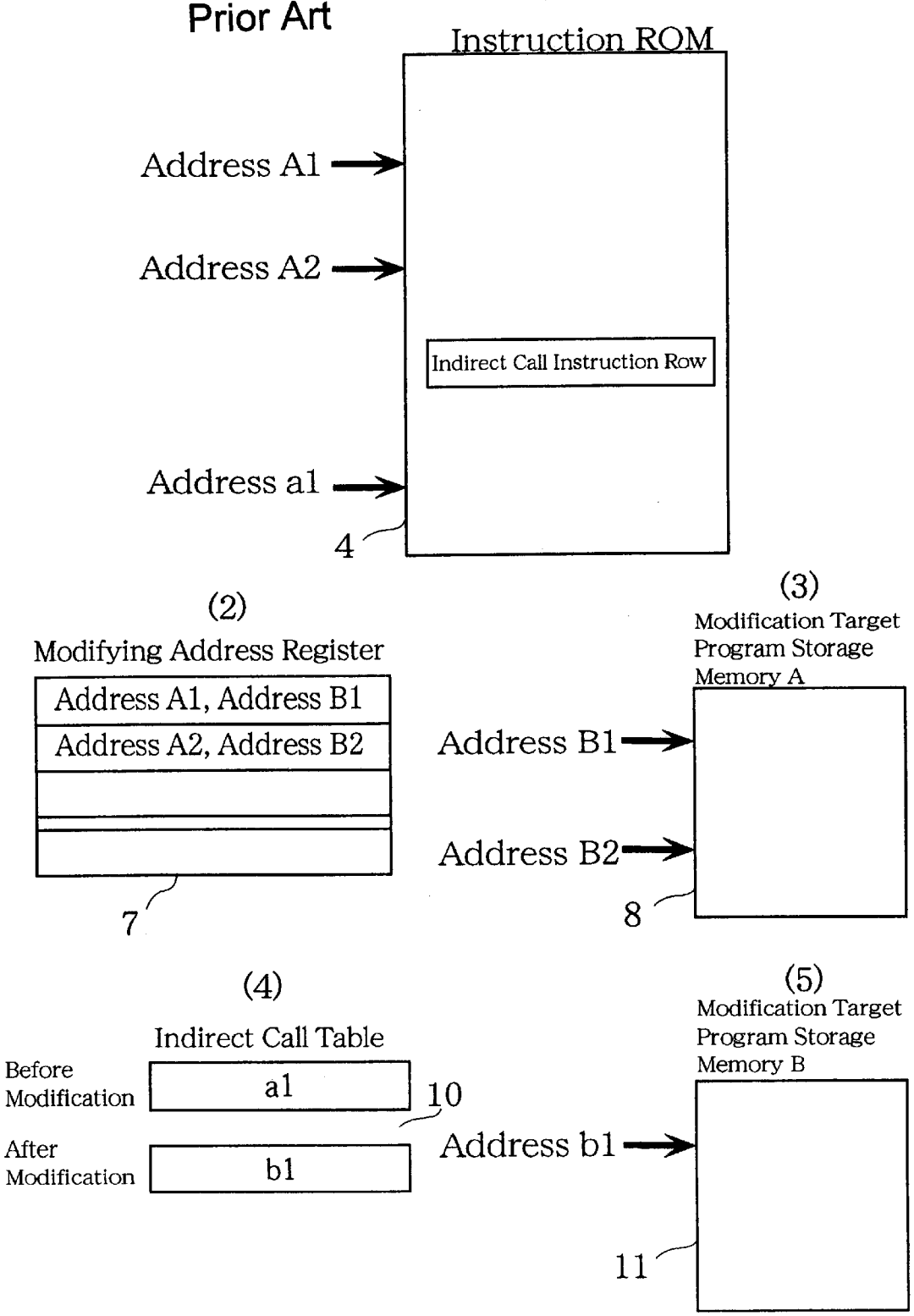
FIGS. 2 (1) to 2 (5) show the conceptual illustrations of an instruction ROM, modifying address registers, a modification target program memory A, an indirect call table, and a modification target program memory B.

In FIG. 5 the modifying address register 17 contains a modification source program address register 211 for use 1 and a modification target program address register 212 for use 1, and further contain a modification source program address register 221 for use 2 and a modification target program address register 222 for use 2. In the present embodiment, not all the contents shown in FIG. 2 (2) in the prior art are written at first. To be more specific, the address of the program data to be executed and modified first and the corresponding modification target program address are exclusively written for each type of modifications in the case where modifications are performed in sequence.

In FIG. 6 the modification target program storage memory 18 contains a number 3 modification instruction 31 which loads the contents of the modifying address storage table 19 to the modifying address register 17.

In FIG. 7 the instruction ROM 14 contains number 1, 2, 4 and 5 modification instructions 41, 42, 44, and 45 which load the contents of the modifying address storage table 19 to the modification source program address register 211 for use 1 and the modification target program address register 212 for use 1 in the modifying address register 17. The instruction ROM 14 further includes a modification instruction X 43 which loads the contents of the modifying address storage table 19 to the modification source program address register 221 for use 2 and the modification target program address register 222 for use 2 in the modifying address register 17.

In FIG. 8 the modifying address storage table 19 stores all of the modification source addresses and the modification target addresses in pairs.

The behavior of the program modification device will be described as follows.

Assume that the addresses A1, A2, A3, M1, S1 and S2 in the instruction ROM 14 shown in FIG. 7, which are the addresses of the modification source programs, are modified so as to execute the modification target programs at the addresses B1, B2, B3, N1, T1, and T2 shown in FIG. 8, respectively.

(1) As shown in FIG. 8, the modification source addresses and the modification target addresses are written in pairs in the modifying address storage table 19 so as to execute the programs at the addresses B1, B2, B3, N1, T1 and T2 instead of the programs at the addresses A1, A2, A3, M1, S1 and S2. At the same time, the programs to be executed after the modification are written at the corresponding addresses in the modification target program storage memory 18. Such writing to the modifying address storage table 19 and to the modification target program storage memory 18 can be performed through a serial interface or from an external CPU accessible to these units.

Figure 9:
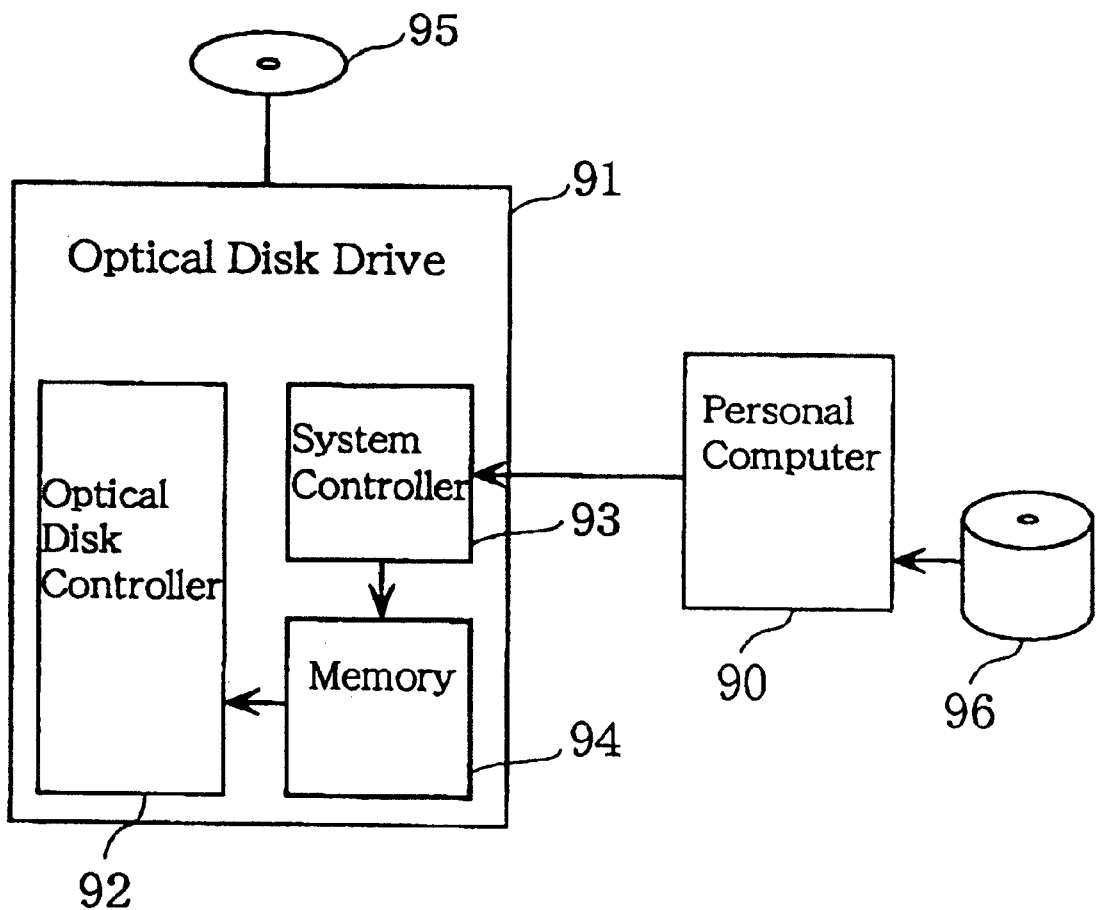
FIG. 9 shows the conceptual illustration in which an external CPU is accessing in order to write necessary modification data to the modifying address storage table and the modification target program storage memory.

The writing is conceptually shown in FIG. 9. In this illustration, the data in a hard disk 96 are written into a memory 94 through an external personal computer 90 and then a system controller 93 inside an optical disk drive 91. The optical disk drive 91 drives an optical disk 95. The memory 94 which stores modification target programs also utilizes a part of the memory of the optical disk drive 91. According to the modification system shown in FIG. 9, it becomes possible for the manufactures and franchised stores to upgrade the programs of games and optical disk drives of old types already sold and their functions by using their CPUs upon user requests.

(2) The instruction ROM 14 has modification instructions embedded therein when it is fabricated; however, these instructions are embedded every predetermined number of program steps because modification positions are not known beforehand. Assume that the modification instructions to be loaded from the modifying address storage table 19 to a program address register for use 1 are used as the modification instructions to modify the programs at the addresses A1, A2, A3, S1 and S2. Also assume that the modification instructions to be loaded from the modifying address storage table 19 to a program address register for use 2 are used as the modification instructions to modify the programs at the address M1.

(3) When a device such as DVD is used, the instruction acquisition unit 3 acquires instructions in sequence from the instruction ROM 14, and the execution unit 2 executes the instructions.

(4) The program monitor unit 5 keeps monitoring the addresses of the program data acquired by the instruction acquisition unit 3 and the addresses of the modification source program data inside the modifying address registers 17 by referring to the modifying address storage table 19.

(5) When the number 1 modification instruction 41 in the instruction ROM 14 shown in FIG. 7 is executed, "the address A1 and the address B1", which is the first pair entered in the modifying address storage table 19, is loaded to the registers 211 and 212 for use 1 in the modifying address register 17. The modifying address register 17 makes it apparent that no address has been written, for example, by setting a maximum value (0xFFFFFFFF for example) as the initial value. Alternatively, a flag can be provided to indicate that no address has been written.

(6) When the instruction acquisition unit 3 tries to acquire program data from the address A1 in the instruction ROM 14 shown in FIG. 7, the program monitor unit 5 makes the acquired instruction switch unit 6 acquire a program from the address B1, which is the pair to the address A1 because the modification source program address in the register 211 is A1. Consequently, the acquired instruction switch unit 6 acquires an instruction from the address B1 in the modification target program storage memory 18 shown in FIG. 6 instead of the address A1 in the instruction ROM 14. This indicates that the program data at the address A1 in the instruction ROM 14 shown in FIG. 4 have been modified into the program data at the address B1 on the modification target program storage memory 18 shown in FIG. 6.

By the program data at the address B1 on the modification program storage memory 18, the modification target program is executed, and the execution of the program in the instruction ROM 14 is returned from a predetermined position or portion by a jump instruction or the like. After each modification target program (data) is executed, the program in the instruction ROM 14 is returned in the same manner hereinafter.

(7) When the number 2 modification instruction 42 in the instruction ROM 14 shown in FIG. 7 is executed, "the address A2 and the address B2", which is the second pair entered in the modifying address storage table 19, is loaded to the registers 211 and 212 for use 1 in place of the pair "the address A1 and the address B1".

(8) When the instruction acquisition unit 3 tries to acquire a program from the address A2 in the instruction ROM 14 shown in FIG. 4, the program monitor unit 5 makes the acquired instruction switch unit 6 acquire a program from the address B2, which is the pair to the address A2 because the modification source program address in the register 211 is A2. Consequently, the acquired instruction switch unit 6 acquires an instruction from the address B2 in the modification target program storage memory 18 shown in FIG. 6 instead of the address A2 in the instruction ROM 14. This indicates that the program data at the address A2 in the instruction ROM 14 shown in FIG. 7 have been modified into the program data at the address B2 on the modification target program storage memory 18 shown in FIG. 6.

(9) After the program at the address A2 in the instruction ROM 14 is modified into the program at the address B2 on the modification program storage memory 18 shown in FIG. 6, the program at the address B2 is executed to reach the number 3 modification instruction 31 in the modification target program storage memory 18. Due to the execution of this modification instruction, "the address A3 and the address B3", which is the third pair entered in the modifying address storage table 19, is loaded to the registers 211 and 212 for use 1 in the modifying address register 17.

(10) When the instruction acquisition unit 3 tries to acquire a program from the address A3 in the instruction ROM 14 shown in FIG. 7; the program monitor unit 5 makes the acquired instruction switch unit 6 acquire program data from the address B3, which is the pair to the address A3 because the modification source program address in the register 211 is A3 Consequently, the acquired instruction switch unit 6 acquires an instruction not from the address A3 in the instruction ROM 14 but from the address B3 in the modification target program storage memory 18 shown in FIG. 6. This indicates that the program data at the address A3 in the instruction ROM 14 shown in FIG. 7 have been modified into the program data at the address B3 on the modification target program storage memory 18 shown in FIG. 6.

By thus arranging the information stored in the modifying address register 17, that is, modification instructions such as the addresses of modification source programs on the modification target program storage memory 18, it becomes possible to execute the modification instructions in the other positions than positions where the modification instructions are previously embedded in the instruction ROM 14, and to modify the program. This can increase the number of positions to be modified as desired.

(11) When the X modification instruction 43 in the instruction ROM 14 shown in FIG. 7 is executed, "the address M1 and the address N1", which is the fourth pair entered in the modifying address storage table 19, is loaded to the registers 221 and 222 for use 2 in the modifying address register 17. In that case, the modification source program address register 211 for use 1 and the modification target program address register 212 for use 1 are not updated because of the different use.

(12) When the instruction acquisition unit 3 tries to acquire a program from the address M1 in the instruction ROM 14 shown in FIG. 7, the program monitor unit 5 makes the acquired instruction switch unit 6 acquire a program from the address N1, which is the pair to the address M1 because the modification source program address in the modification source program address register 221 for use 2 in the modifying address register 17 is M1. Consequently, the acquired instruction switch unit 6 acquires a program to be executed not from the address M1 in the instruction ROM 14 but from the address N1 in the modification target program storage memory 18 shown in FIG. 6. This indicates that the program data at the address M1 in the instruction ROM 14 shown in FIG. 7 have been modified into the program data at the address N1 on the modification target program storage memory 18 shown in FIG. 6.

The program modification is performed regardless of the value of the register for use 1 in the modifying address register 17. For examples in the case where the resister for use 1 is used for program modification (to make the program bug-free), and the register for use 2 is used for debugging (to add a program for debugging such as dumping the status of memory or register), the modification program for debugging has effects and advantages of being able to be fabricated independently of the modification program for modifying bugs.

(13) The number 4 and 5 modification instructions 44 and 45 in FIG. 7 are arranged at the heads of interrupt-service routines and of the switch points of tasks (positions to issue system calls for example).

(14) When the number 4 and 5 modification instructions 44 and 45 in the instruction ROM 14 shown in FIG. 7 are executed, "the address S1 and the address T1" or "the address S2 and the address T2", which are the fifth or sixth pairs entered in the modifying address storage table 19, is loaded to the registers 211 and 212 for use 1 instead of the addresses of the already processed modification portions.

(15) When the instruction acquisition unit 3 tries to acquire a program from the address S1 in the instruction ROM 14 shown in FIG. 7, the program monitor unit 5 makes the acquired instruction switch unit 6 acquire a program from the address T1, which is the pair to the address S1 because the modification source program address in the register 211 is S1. Consequently, the acquired instruction switch unit 6 acquires an instruction not from the address S1 in the instruction ROM 14 but from the address T1 in the modification target program storage memory 18 shown in FIG. 6. This indicates that the program data at the address S1 in the instruction ROM 14 shown in FIG. 7 have been modified into the program data on the modification target program storage memory 18 shown in FIG. 6. This holds true with the address S2.

The arrangement of modification instructions at the heads of interrupt-service routines and of the switch points of tasks indicate that modification instructions are arranged in all the heads of the positions which operate asynchronously. By further arranging load modification instructions together with inherent correct programs in the modification target program storage memory 18, it becomes possible to embed modification instructions only at the heads of interrupt-service routines and of task switch points, which is the minimum number to be previously embedded in the instruction ROM 14.

When additional modification instructions are needed, they can be arranged on the modification target program storage memory 18 so as to perform program modification at a necessary number of positions.

Figure 10:
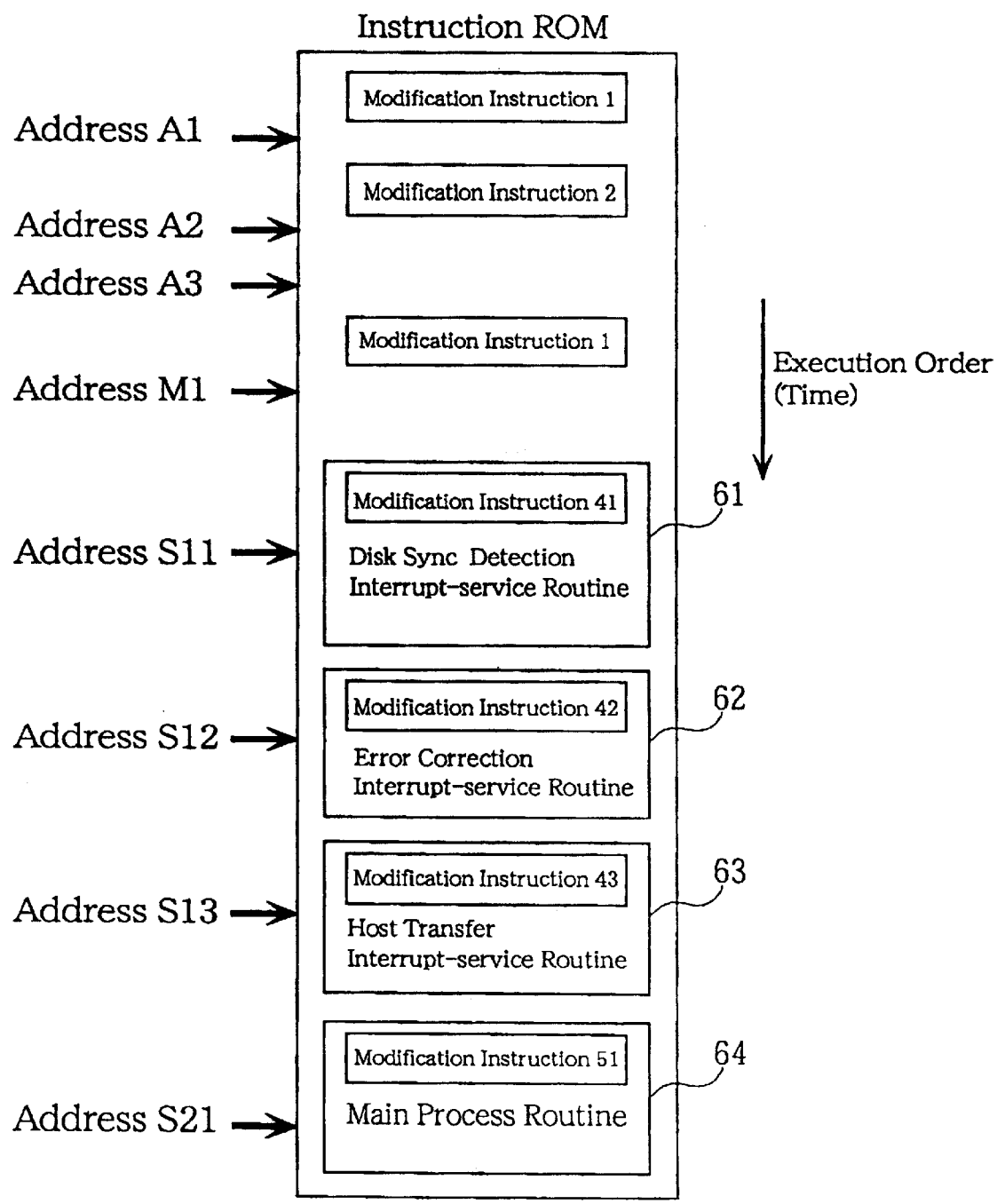
FIG. 10 shows the conceptual illustration of the instruction ROM.

The interrupt-service routines and the task switch points include a disk sync detection interrupt-service routine 61, an error correction interrupt-service routine 62, a host transfer interrupt-service routine 63 and a main process routine 64 shown in FIG. 10 in the case of an optical disk controller. In these routines 61 to 64, the load modification instructions 41, 42, 43 and 51 could be embedded, respectively. If necessary, load modification instructions could be arranged on the modification target program storage memory 18.

(Embodiment 2)

The present embodiment relates to the execution of data modified by the saving of a program in the process of being executed and interrupt-service routines when an interrupt occurs, as described last in the first embodiment.

Figure 11:
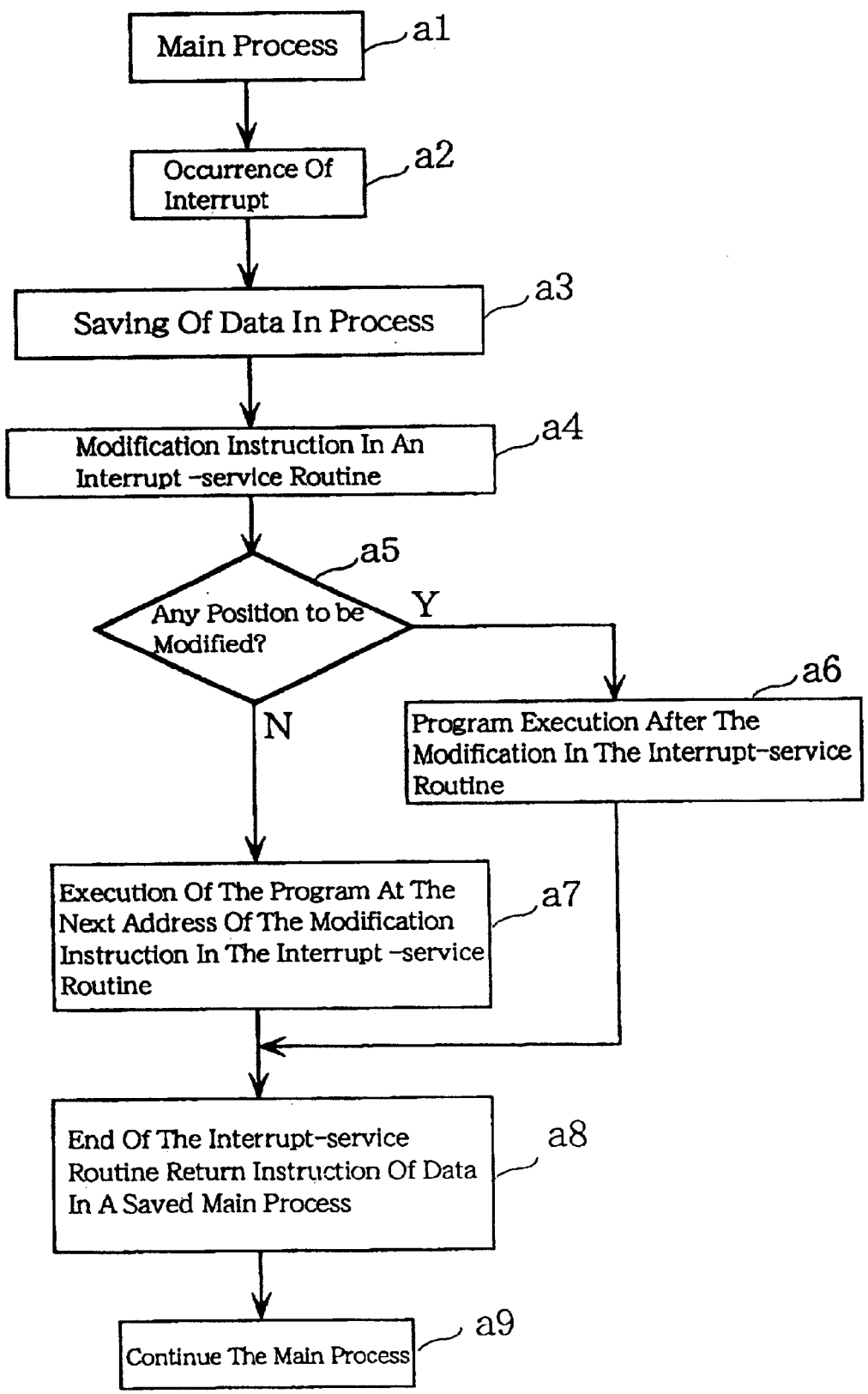
FIG. 11 shows a conceptual flowchart depicting the procedure of the execution of a program in the third embodiment of the program modification device of the present invention.

FIG. 11 shows a flowchart depicting the procedure in the present embodiment.

In a DVD (optical disk drive), in a series of processes including displaying digital data like images read from DVD-ROM, there are various kinds of independent interrupts such as error (codes) correction of the read digital data, the transfer of corrected data to the host CPU and synchronous detection. In that case, the program data in process is saved in every independent process, and modification instructions are previously stored at the beginning of the program data for an interrupt process. Consequently, in such a case where the presence of an error in the routine of an instruction to transfer to the host CPU is found after the fabrication of ROM has been completed, this routine can be modified exclusively.

At the steps a4 and a5 in FIG. 11, when there is no modification in the routine, a program in the address next to the modification instruction is read and executed at the step a7. On the other hand, when there is a modification, the modified program is executed at the step a6. The execution of the modification-free program and the procedure of the execution of the modified program at the steps a6 and a7 are the same as those in the first embodiment, so that the description will be omitted.

When the process of the interrupt-service routine is finished, the saved data are returned at the step a8 so as to resume the original process.

In the present embodiment, the interrupt is one step. When another interrupt occurs during the process of the preceding interrupt, the fundamental process does not change except that the interrupt process becomes complicated such as data saving becoming two steps.

(Embodiment 3)

In the present embodiment, in order to reduce the cost, the expensive modifying address registers are exclusively used to store the addresses of modification source program data.

The program modification device of the present embodiment will be described as follows with reference to the drawings by concentrating on the parts that differ from the first and second embodiments.

Figure 12:
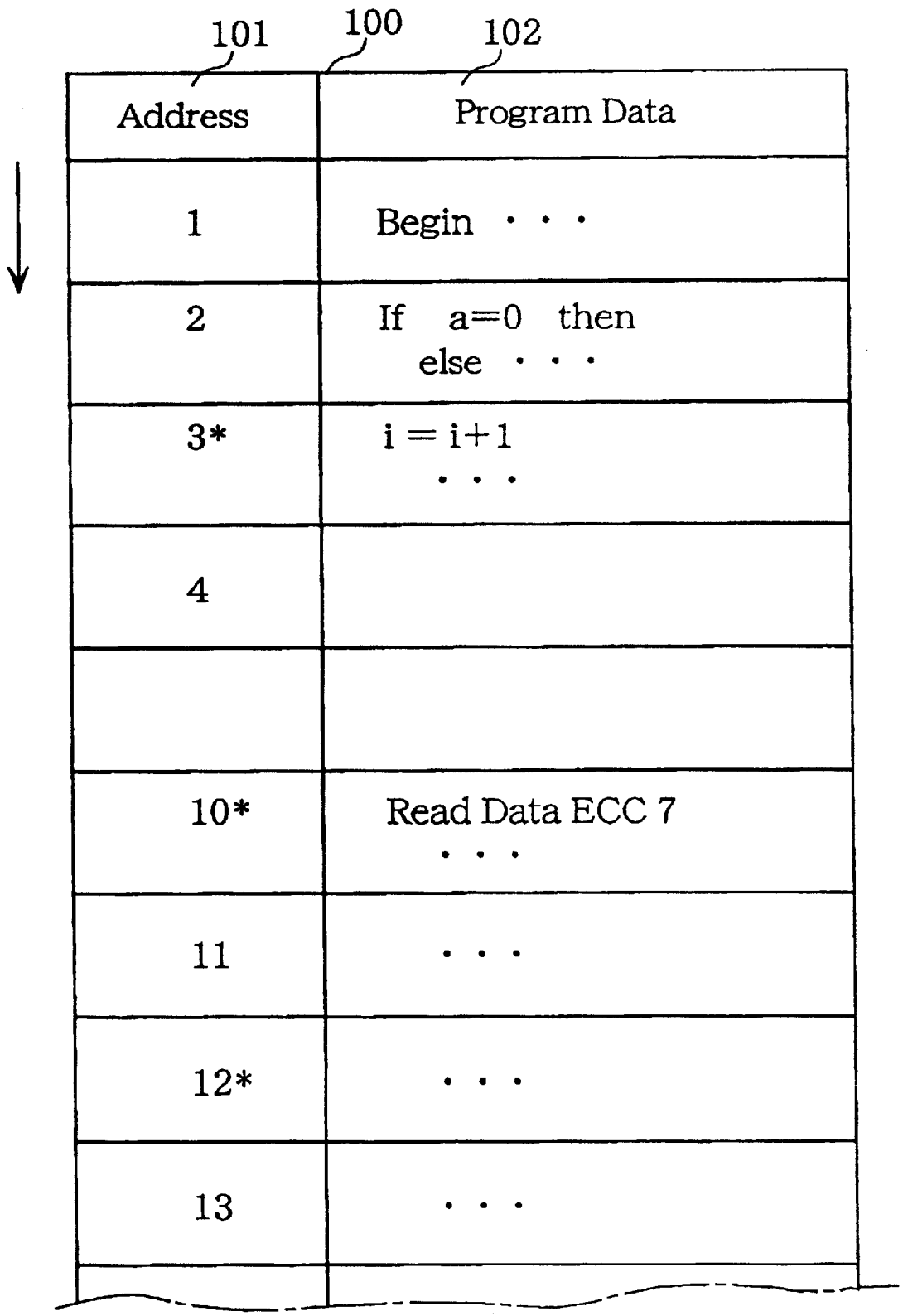
FIG. 12 shows the conceptual illustration of an execution program in the third embodiment of the program modification device of the present invention.

FIG. 12 shows the conceptual illustration of the contents of a program, which are actually written in machine language, to be executed by the CPU core unit in the third embodiment. In the illustration, an execution program 100 includes an address 101 and program data 102 formed in a pair. The asterisks on the addresses 3, 10 and 12 show the presence of errors in the program data at these addresses.

Figure 13:
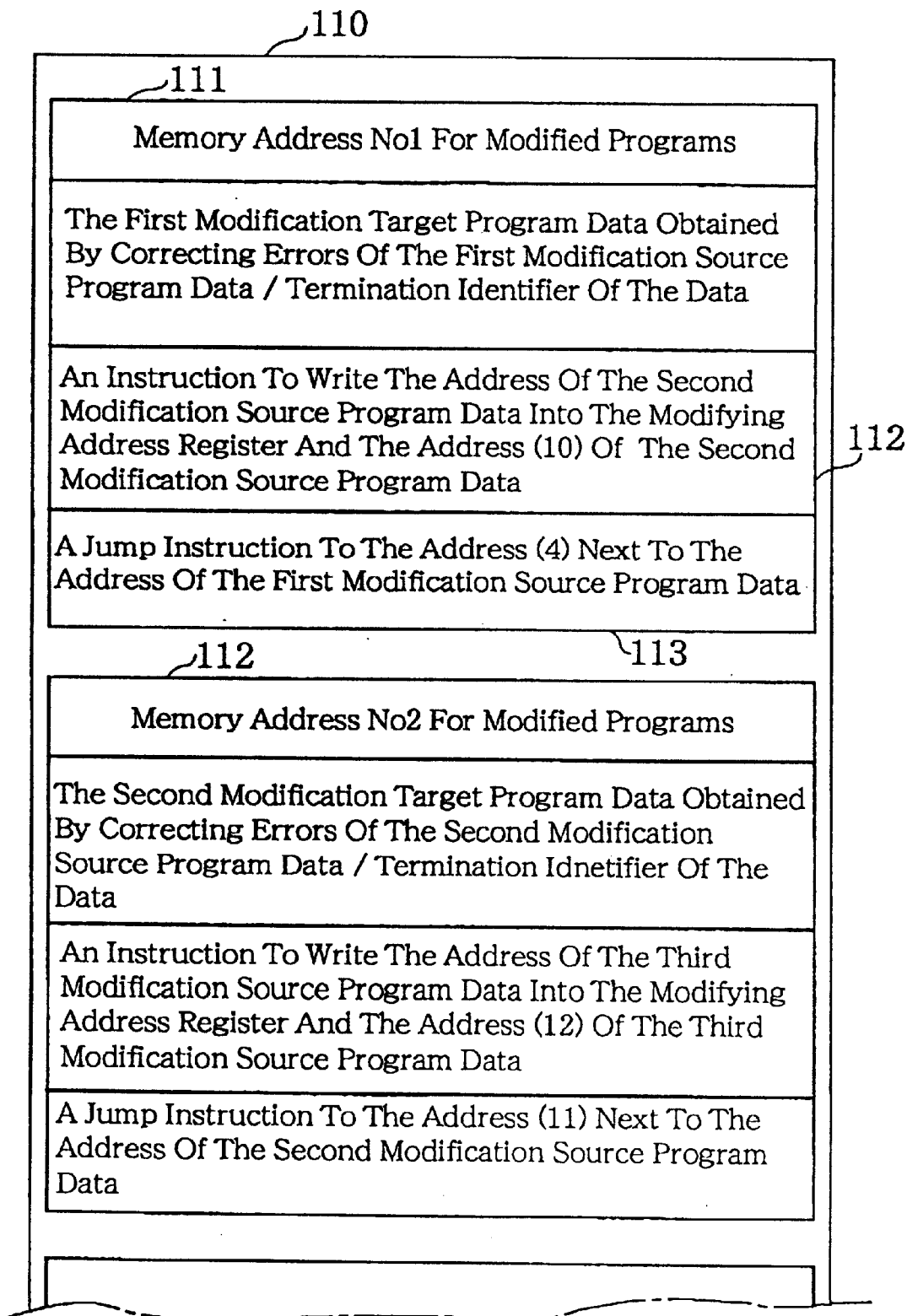
FIG. 13 shows the conceptual illustration of memory for modified programs which also serves as a modifying address storage table in the third embodiment.

FIG. 13 shows the conceptual illustration of a memory 110 for modification programs which also serves as a modifying address storage table. As shown in FIG. 13 at each address of the memory 110, data for sequential modifications are stored in the order in which the modification source programs in execution programs are executed. The data for sequential modifications comprises a modification source program data unit 111 which stores modification target program data obtained by modifying the errors of the modification source program data, and the termination identifier of the modification target program data; a next modification preparation data unit 112 which stores the address (number) of the next modification source program data and instructions to write this address in the modifying address register; and a return data unit 113 which stores data for a jump to a predetermined address of the execution data.

Figure 14:
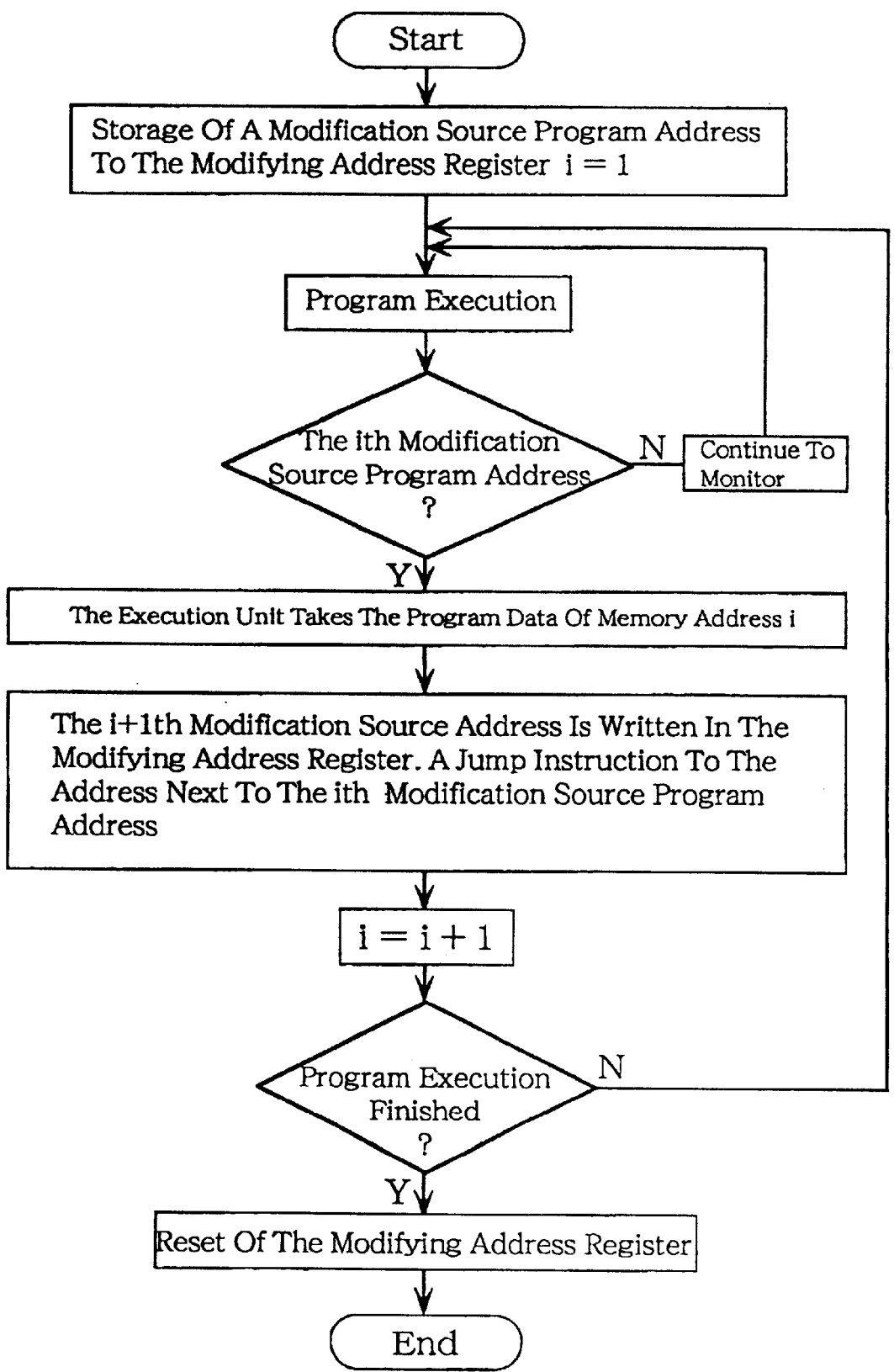
FIG. 14 shows a flowchart depicting the procedure of executing a program while sequentially correcting errors in the third embodiment.

FIG. 14 shows the flowchart depicting the procedure of sequentially executing execution programs by replacing error-containing program data with error-corrected program data. The procedure will be described as follows with reference to FIGS. 12, 13 and 14.

1) Before starting the execution programs, the first modification source program address (3 in FIG. 12) is stored in the modifying address register 17. Furthermore, i=1 is set at the counter (not shown) in the acquired instruction switch unit 6. This writing and the first modification source program address itself could be written in another memory for initial setting. Alternatively, another instruction could be written from the beginning under the assumption that there is a modification at the beginning of the execution programs.

2) Programs are executed in descending order by address.

3) The program monitor unit 6 continuously checks whether or not the address of the program data that the execution unit 2 of the CPU core unit 1 acquires for process agrees with the address in the modifying address register 17.

4) When these addresses agree with each other, the acquired instruction switch unit 6 invokes the data at the address i (i=1 when it is the first). Under these circumstances, error-corrected program data are executed in place of the error-containing program data corresponding to the modification source program address, and the address of the next modification source program is overwritten in the modifying address register 17 (when it is the first, "10" is written as shown in FIG. 12). Thus, the counter value becomes i=i+1 (when it starts at i=1, the value becomes 2), and a jump takes place to the address of the program to be executed next in the execution programs (when the modification source program address is "3", the next address is "4").

5) The execution unit 2 executes execution programs in sequence. Hereinafter, these processes are repeated for each modification source program data.

As known from the above-mentioned description, the present embodiment is useful when execution programs are executed in descending order by address.

As a modified example of the present embodiment, it is possible to store modification source program addresses and modification target program address in pairs, and further store the modification target program data in another memory. This modified example is useful when execution programs contain branches and loops.

As further another modified example, it is possible to write the identifier of a load modification instruction useful to specify a modification target address before and after the load modification instruction in a specified memory, and to make the program monitor unit 5 determine the modification target address from the identifier.

As further another modified example, it is possible to provide a memory for each branch of a task and to store modification target program data and instructions involved in these program data sequentially in the memory.

Moreover, modification target program data could be found, based on the addresses 3, 10 and 12 in the address 101 shown in FIG. 12 instead of "i", and by further referring to the contents of FIG. 13.

(Embodiment 4)

In the present embodiment, the next modification target programs are exclusively stored in a memory capable of high-speed readout.

Figure 3:
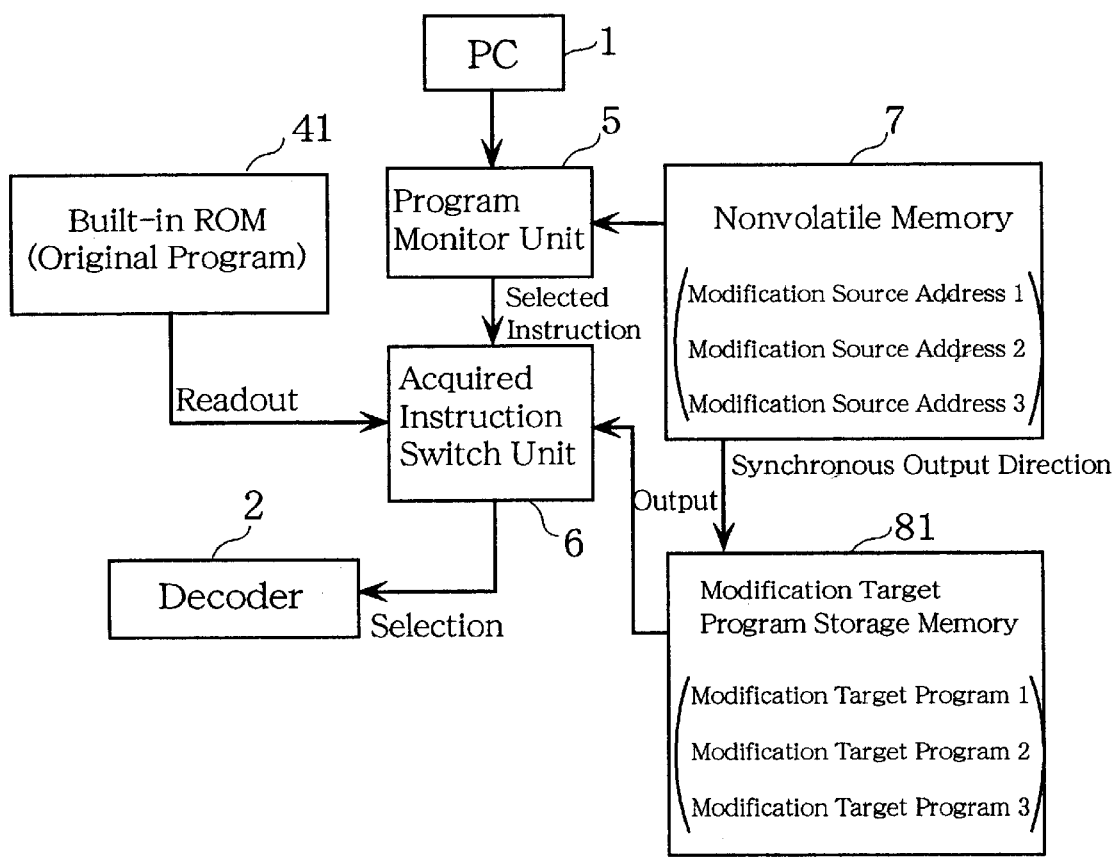
FIG. 3 shows the structure of another conventional program modification device.

FIG. 15 (2) shows the structure of the program modification device of the present embodiment. FIG. 15 (1) shows the structure of an example of the program modification device of the third embodiment. When comparisons are made with the conventional device shown in FIG. 3, the program modification device shown in FIG. 15 (1) has a feature that the expensive register 17 exclusively stores the addresses of the next modification source programs, and the addresses of the other modification source programs are stored in an inexpensive nonvolatile memory 70. In contrast, the program modification device of the present embodiment shown in FIG. 15 (2) has a feature that the modification target program corresponding to the address of the next modification source program is exclusively stored in a memory 73 capable of high-speed readout in addition to the storage of the address of the next modification source program to the register 17. This feature realizes the further speedups of program processing, thereby increasing the effects of the present invention on some kinds of device system.

Although the present invention has been described so far based on the embodiments, the device of the invention is not restricted to the above description, and further includes the following features.

1) Like the conventional device, the device of the present invention has an indirect call table.

2) The register which stores various types of instructions delivers its performance by dividing it into several portions. In other words, the register is plural in terms of use, but is physically and mechanically one.

3) The register for various load modification instructions can be replaced by other types of registers.

4) The modification of a program can be the upgrading of programs instead of error correction. Alternatively, various modification instructions are integrated into the device in expectation of the contents to be upgraded in a program.

5) As mentioned in the fourth embodiment, the memory for modification target program data has a multi-step structure and the acquired instruction switch unit is a kind of selector. They may have structures different from the structures described in the claims of the present invention or may be subjected to other processes; however, the actions and effects based on the structures in the claims of the present invention can be substantially obtained.

INDUSTRIAL APPLICABILITY

As will be understood from the aforementioned description, the present invention makes it possible to perform error correction at any positions in an execution program or to perform modification for upgrading, with the use of a little hardware (modifying address register).

These effects are remarkable when the inventions of aspects 5 and 6 are applied to the heads of task switch points of a demodulating process, an error correcting process, a data transfer process to the host personal computer in programs such as a servo-controlled process and a data error correcting process in a DVD drive.

In a field where upgrading occurs at high speed, a CPU system containing programs of old versions can be changed into an upgraded CPU system only by adding a few memories for modification. Therefore, in same cases, it is possible to perform modifications of old programs and data in order to make them operate or display. As a result, while users can purchase modified programs or data only, the manufactures make it a selling point when they sell devices in a field where upgrading in programs occurs at high speed.

What is claimed is:

1. A program modification device for executing modified programs in place of programs unable to be modified as-is because of being fixedly recorded in an instruction ROM or the like, comprising:

a CPU core unit;

a memory for modification target program data for storing modification target program data corresponding to modification source program data before said CPU core unit starts program execution;

a modifying address storage table for storing a necessary number of pairs of addresses of such modification source program data and addresses of such modification target program data before said CPU core unit starts program execution;

a modifying address register for storing the addresses of such modification source program data and addresses of such modification target program data before said CPU core unit starts to execute such modification source program data;

an execution unit located in said CPU core unit for loading into said memory for modification target program data addresses of such modification source program data and the addresses of such modification target program data from said modifying address storage table to predetermined positions in said modifying address register in accordance with contents of load modification instructions, when said execution unit detects such load modification instructions in a program, based on address information stored in said modifying address register;

a program monitor unit for detecting agreement between an address of program data to be executed by said CPU core unit and an address of modification source program data in said modifying address register, with reference to said modifying address register, before execution of modification source program data corresponding to such modification source program address; and an acquired instruction switch unit for performing replacement of necessary program data and addresses in order to make said execution unit in said CPU core unit read from said memory for modification target program data the program data at a modification target address corresponding to the program data at a modification source address stored in said modifying address register, instead of the program data at such modification source address, when said program monitor unit detects agreement between both addresses.

2. The program modification device of claim 1, wherein said execution unit is for loading into said memory for modification target program data modification target program data containing load modification instructions in predetermined positions therein, such load modification instructions having predetermined contents about a program to be modified and executed according to such modification target program data.

3. The program modification device of claim 2, wherein said CPU core unit is for executing a program and modification target program data, wherein one of such program and such modification target program data including load modification instructions contains modification instructions to be loaded from said modifying address storage table to said modifying address register at heads of task switch points and interrupt-service routines.

4. The program modification device of claim 3, wherein said CPU core unit is for executing a program or program data containing load modification instructions to be loaded from said modifying address storage table to said modifying address register at a head of at least one of a task switch point, a disk sync detection interrupt-service routine, an error correction interrupt-service routine, a host transfer interrupt-service routine and a servo-controlled routine.

5. The program modification device of claim 1, further comprising:

a plurality of modifying address registers corresponding to types of modifications of program data, and said CPU core unit for executing a first program and modification target program data, wherein one of such first program and such modification target program data including load modification instructions contains a plurality of types of modification instructions to be loaded to said plurality of modifying address registers in such program to be executed by said CPU core unit or the modification target program data.

6. A program modification device for executing modified programs in place of programs unable to be modified as is because of being fixedly recorded in an instruction ROM or the like, comprising:

a CPU core unit;

a memory for modification target program data for storing modification target program data corresponding to modification source program data before said CPU core unit starts program execution;

a modifying address storage table for storing a necessary number of pairs of addresses of such modification source program data and addresses of such modification target program data before said CPU core unit starts program execution;

a modifying address register for storing the addresses of such modification source program data before said CPU core unit starts to execute such modification source program data;

an execution unit located in said CPU core unit for loading into said memory for modification target program dat addresses of such modification source program data from said modifying address storage table to predetermined positions in said modifying address register in accordance with contents of load modification instructions, when said execution unit detects such load modification instructions in a program, based on address information stored in said modifying address register;

a program monitor unit for detecting agreement between an address of a program to be executed by said CPU core unit and an address of a modification source program in said modifying address register, with reference to said modifying address register, before execution of modification source program data corresponding to such modification program address; and an acquired instruction switch unit for performing replacement of necessary program data and addresses in order to make said execution unit in said CPU core unit read from said memory for modification target program data the program data at a modification target address corresponding to a program at a modification source address stored in said modifying address register, instead of a program at such modification source address, when said program monitor unit detects agreement between both addresses.

7. A program modification device for executing modified programs in place of programs unable to be modified as-is because of being fixedly recorded in an instruction ROM or the like, comprising:

a CPU core unit;

a memory for modification target program data for storing modification target program data corresponding to modification source program data in accordance with information or rules for specifying an address of such modification target program data before said CPU core unit starts program execution;

a modifying address storage table for storing a necessary number of pairs of information or rules for specifying addresses of such modification target program data and addresses of such modification source program data before said CPU core unit starts program execution;

a modifying address register for storing the addresses of such modification source program data before said CPU core unit starts to execute such modification source program data;

an execution unit located in said CPU core unit for loading into said memory for modification target program data addresses of such modification source program data from said modifying address storage table to predetermined positions in said modifying address register in accordance with contents of load modification instructions, when said execution unit detects such load modification instructions in a program, based on address information stored in said modifying address register;

a program monitor unit for detecting agreement between an address of a program to be executed by said CPU core unit and an address of a modification source program in said modifying address register, with reference to said modifying address register, before execution of modification source program data corresponding to such modfication source address; and an acquired instruction switch unit for performing necessary processes in order to make said execution unit in said CPU core unit execute the program data at a modification target address which has been obtained from said memory for modification target program data and corresponds to a program at a modification source address stored in said modifying address register, instead of a program at such modification source address when said program monitor unit detects agreement between both addresses, based on the information to specify such address of the modification target program data.

8. A method of modifying programs comprising in sequence:

loading an entrant in a modifying address storage table to a modifying address register, according to a modification instruction existing in an instruction ROM;

monitoring agreement between an address of an instruction which is being executed and a modification source address in said modifying address storage table;

executing a modified program stored in a memory different from said instruction ROM, when agreement is detected in said monitoring agreement; and loading the entrant in said modifying address storage table to said modifying address register, according to a modification instruction stored in the memory different from said instruction ROM, after agreement is detected in said monitoring agreement.

* * * * *